US012122594B2

(12) United States Patent
Douglas

(10) Patent No.: US 12,122,594 B2
(45) Date of Patent: Oct. 22, 2024

(54) COUNTER-WEIGHTED DUMPSTER LID

(71) Applicant: Superior Equipment LLC, Elkhart, IN (US)

(72) Inventor: Michael P. Douglas, Granger, IN (US)

(73) Assignee: Superior Equipment, LLC, Elkhart, IN (US)

( * ) Notice: Subject to any disclaimer, the term of this patent is extended or adjusted under 35 U.S.C. 154(b) by 0 days.

(21) Appl. No.: 17/882,951

(22) Filed: Aug. 8, 2022

(65) Prior Publication Data

US 2023/0047135 A1 Feb. 16, 2023

Related U.S. Application Data

(60) Provisional application No. 63/231,297, filed on Aug. 10, 2021.

(51) Int. Cl.
*B65F 1/16* (2006.01)

(52) U.S. Cl.
CPC .................................. *B65F 1/1623* (2013.01)

(58) Field of Classification Search
CPC ................................ B65F 1/16; B65F 1/1623
USPC ........................................ 220/810, 828, 832
See application file for complete search history.

(56) References Cited

U.S. PATENT DOCUMENTS

| | | | | |
|---|---|---|---|---|
| 5,085,341 A * | 2/1992 | Hodge | B65F 1/1615 | 220/817 |
| 5,105,967 A * | 4/1992 | Horpestad | B65F 1/1646 | 220/817 |
| D361,417 S * | 8/1995 | Douglas | D34/11 | |
| 5,595,317 A * | 1/1997 | Hodge | B65F 1/16 | 220/744 |
| 6,276,562 B1 * | 8/2001 | Hodge | B65F 1/1646 | 220/744 |
| 7,984,822 B2 * | 7/2011 | Watson | F27D 1/1858 | 220/254.5 |
| 8,439,218 B1 * | 5/2013 | Watts | B65F 1/163 | 220/264 |
| 9,409,708 B1 * | 8/2016 | Watts | B65F 1/163 | |
| 9,718,616 B1 * | 8/2017 | Deming | B65F 1/1646 | |
| 11,280,125 B1 * | 3/2022 | Christie | B65F 1/1623 | |
| 2005/0045650 A1 * | 3/2005 | Tippman | B65D 43/16 | 220/828 |
| 2005/0077307 A1 * | 4/2005 | Taylor | B65F 1/1646 | 220/817 |
| 2016/0023847 A1 * | 1/2016 | Guild | B65F 1/1646 | 49/386 |
| 2019/0218030 A1 * | 7/2019 | Kemp | B65F 1/1623 | |
| 2020/0055670 A1 * | 2/2020 | Hodge | B65F 1/16 | |
| 2023/0227245 A1 * | 7/2023 | Grip | F25D 11/003 | 62/61 |

FOREIGN PATENT DOCUMENTS

| | | | | |
|---|---|---|---|---|
| CN | 112918946 A * | 6/2021 | B65F 1/0093 |
| WO | WO-9736803 A1 * | 10/1997 | B65F 1/122 |

* cited by examiner

*Primary Examiner* — J. Gregory Pickett
*Assistant Examiner* — Niki M Eloshway
(74) *Attorney, Agent, or Firm* — Barnes & Thornburg LLP

(57) ABSTRACT

A dumpster lid assembly for use on an opening of a dumpster is provided. The dumpster lid assembly includes at least one dumpster lid having a first end and a second end. The first end is configured to be moved with respect to the at least one dumpster lid. At least one weight is located at least adjacent the second end and distal from the first end of the at least one dumpster lid.

18 Claims, 12 Drawing Sheets

COUNTER-WEIGHTED DUMPSTER LID

RELATED APPLICATION

The present application relates to and claims priority to U.S. Provisional Patent Application, Ser. No. 63/231,297, filed on Aug. 10, 2021. The subject matter disclosed in that Provisional Application is hereby expressly incorporated in its entirety into the present application.

TECHNICAL FIELD AND SUMMARY

The present disclosure relates to a waste container and particularly to a dumpster having one or more counter-weighted lids to ease opening of the lid over the dumpster.

Large waste receptacles such as waste containers, commonly known as dumpsters are used in large residential and commercial environments to collect refuse. When the dumpster is filled or pursuant a predetermined schedule, a garbage truck arrives at the dumpster, lifts the dumpster, and empties its contents to be hauled away. The dumpster is then available again to be refilled.

A typical dumpster includes one or more lids to shroud its opening. This conceals the trash or garbage within the dumpster, making it look less unsightly while also reducing odors. For front-loading dumpsters, its lid or lids may be pivotably attached, either at the rear or side of the dumpster. The lids may be lifted upward to access the interior of the dumpster and lowered to shroud same.

Front-loading dumpsters also typically have arm pocket brackets on each side. These pockets receive prongs attached to a garbage truck lift arm. The prongs lift the dumpster up over the top of the garbage truck and upside down to drop its contents from the dumpster into a container portion of the garbage truck. The lids on the dumpster freely pivot so that gravity opens them while the dumpster is located upside down over the garbage truck for emptying the dumpster.

Because such dumpsters are commonly used in both residential and commercial environments, it is likewise common for persons to need access to the dumpster to discard trash or refuse. Unlike small trash cans or waste receptacles, dumpsters may be relatively large—possibly about 6 feet wide by 4 feet or more deep, for example. Likewise, the lids for these dumpsters are relatively large as they are required to cover all or a portion of the dumpster's opening. The result is that these relatively large lids may be difficult or cumbersome to lift for certain individuals.

An illustrative embodiment of the present disclosure provides a dumpster lid assembly for use on an opening of a dumpster. The dumpster lid assembly comprises at least one dumpster lid having a first end and a second end located opposite the first end. The first end is configured to be lifted to open the at least one dumpster lid with respect to the opening of the dumpster. A pivot axis is located at least adjacent the second end of the at least one dumpster lid. The at least one dumpster lid is pivotable about the pivot axis to open the at least one dumpster lid with respect to the dumpster. At least one counterweight is located at least adjacent the pivot axis and distal from the first end of the at least one dumpster lid.

In the above and other illustrative embodiments, the present disclosure may further comprise: the at least one counterweight being an integrally formed part of the at least one dumpster lid; the at least one counterweight being attached to the at least one dumpster lid; the first end of the at least one dumpster lid being a front-opening end and the second end of the at least one dumpster lid is a rear-pivoting end; the first end of the at least one dumpster lid being a central-opening end and the second end of the at least one dumpster lid is a side-pivoting end; the at least one counterweight being a plurality of counterweights; a pivot rod extendable through the at least one counterweight; a pivot rod sleeve extended through the at least one counterweight; the pivot axis being located between at least a portion of the at least one counterweight and the first end; the at least one counterweight extends from the second end of the at least one dumpster lid and away from the first end; at least one pivot rod support located adjacent the at least one counterweigh; a first pivot rod support located adjacent the second end and adjacent a first counterweight of the at least one counterweight, a second pivot rod support located adjacent to the first counterweight of the at least one counterweight and a second counterweight of the at least one counterweight, and a third pivot rod support located adjacent the second end and adjacent the second counterweight of the at least one counterweight; the at least one counterweight includes a fillable cavity; the at least one counterweight being made of a weighted material selected from the group consisting of at least one of a metal, plastic, sand, cement, and fluid; the at least one counterweight being selected from the group consisting of at least one of a ring and a bar; the at least one counterweight extends from the at least one dumpster lid to serve as a stop that limits an extent to which the at least one dumpster lid is pivotable to a predetermined amount.

Another illustrative embodiment of the present disclosure provides a dumpster lid assembly for use on an opening of a dumpster, the dumpster lid assembly comprises at least one dumpster lid having a first end and a second end located opposite the first end. The first end is configured to be lifted to move the at least one dumpster lid with respect to the opening of the dumpster. At least one counterweight is located at least adjacent the second end of the at least one dumpster lid.

In the above and other illustrative embodiments, the present disclosure may further comprise: the at least one dumpster lid includes a pivot axis located at least adjacent the second end of the at least one dumpster lid, and wherein the at least one dumpster lid being pivotable about the pivot axis to move the at least one dumpster lid with respect to the dumpster; and the at least one counterweight is a plurality of counterweights.

Another illustrative embodiment of the present disclosure provides a dumpster lid assembly for use on an opening of a dumpster, the dumpster lid assembly comprises at least one dumpster lid having a first end and a second end. The first end is configured to be moved with respect to the at least one dumpster lid. At least one weight is located at least adjacent the second end and distal from the first end of the at least one dumpster lid.

Additional features and advantages of the counter-weighted dumpster lid will become apparent to those skilled in the art upon consideration of the following detailed descriptions exemplifying the best mode of carrying out the counter-weighted dumpster lid as presently perceived.

BRIEF DESCRIPTION OF THE DRAWINGS

The concepts described in the present disclosure are illustrated by way of example and not by way of limitation in the accompanying figures. For simplicity, and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

Figure 1:
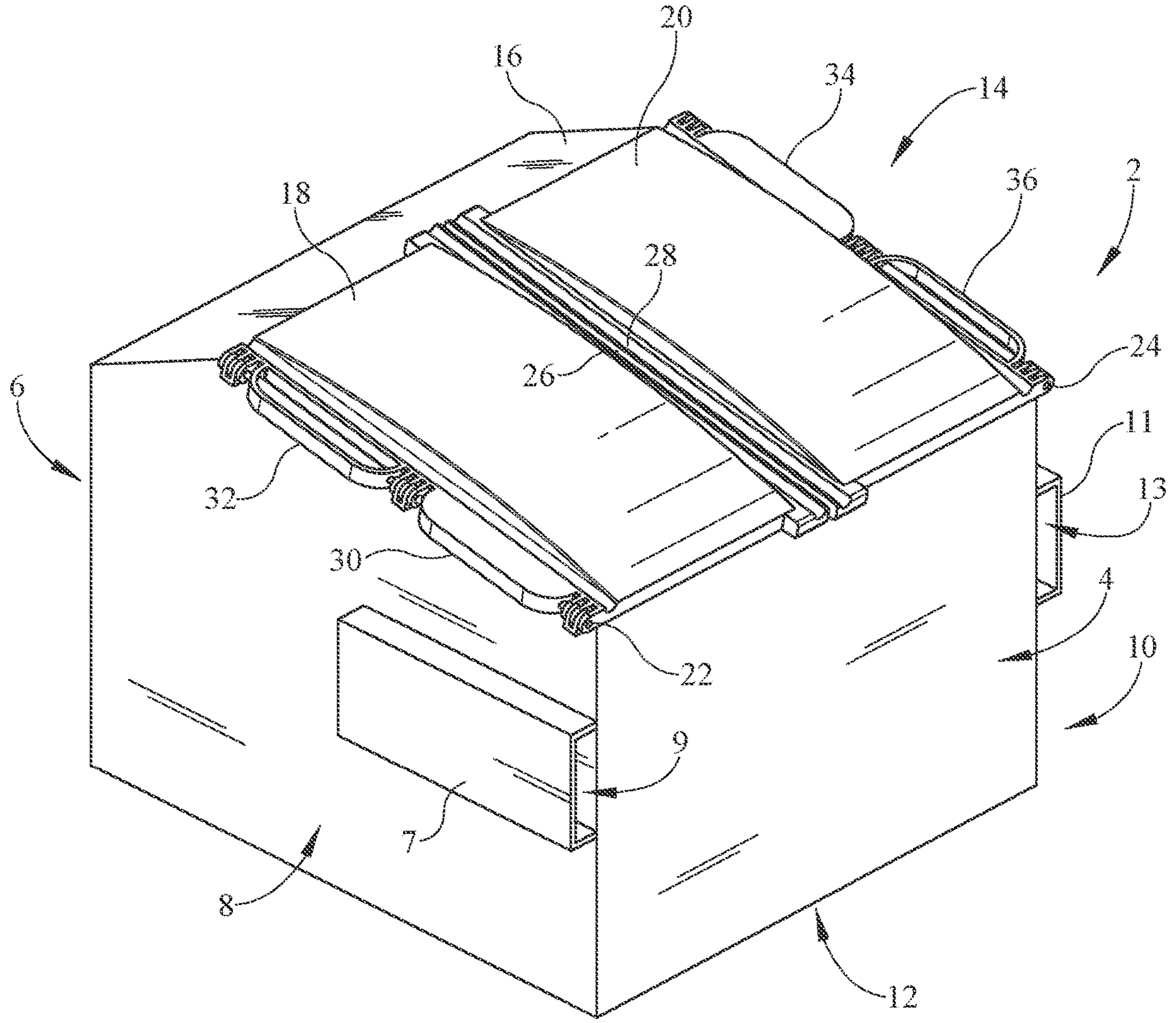
FIG. 1 is a perspective view of a dumpster with lids located over top.

Corresponding reference characters indicate corresponding parts throughout the several views. The exemplification set out herein illustrates embodiments of the counter-weighted dumpster lid and such exemplification is not to be construed as limiting the scope of the counter-weighted dumpster lid in any manner.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

An illustrative embodiment of the present disclosure provides a dumpster lid that acts as a lever to more easily open when a lesser lifting force is acted on the lid. One or more counterweights may be attached to or be an integrally formed part of a dumpster lid to assist in lifting it. The lid may include one or more counterweights illustratively located on the lid adjacent its pivot axis opposite and distal from an opposing lift end of the lid. That opposing end of the lid is illustratively where it is lifted by an individual to open the same. For a side-opening lid type, it is designed to be lifted on one side while pivotably attached to the dumpster at an opposed side. Attachment to the dumpster may be via a pivot rod coupled to either the sidewall and/or front and rear walls. While lifting the lid, the counterweight located on the opposite side of the pivot axis assists in lifting the lid upward about the pivot axis, requiring less lifting force to be exerted than would otherwise be needed for lifting the lid. The counterweight will help move the lid upward. Consequently, less effort is required by a person to lift the lid in order for it to open sufficient to allow access inside the dumpster. In this way, an individual who may otherwise have difficulty lifting the dumpster lid may now do so.

In illustrative embodiments, the counterweights may be integrally formed with the lid, attached onto, or provide a fillable cavity for weighted material. One or more counterweights may be included on the lid depending on the weight and size of the lid. In one example, the counterweight may be composed of additional plastic (or other lid material) added to one end of the lid for providing sufficient weight to assist in lifting the lid. One or more such counterweights may be provided adjacent the pivot axis to create sufficient weight to produce the open-assist effect on the opposite side of the lid distal from the pivot axis.

In another embodiment, one or more weight cavities may be located on the lid adjacent the pivot axis. These one or more cavities may be filled with any variety of weighted materials such as metal, plastic, sand, cement, and fluid or other like weighted materials sufficient to provide weight to one side of the lid. In a further embodiment, the lid may include one or more rings or bars that weights can be attached to in order to assist opening the lid. In this embodiment, one or more rings or bars may be used, depending on the weight of the lid, to receive one or more weights. Using trial-and-error, multiple weights can be added or removed to the rings or bars to get a desired lift-assist on the lid. For example, one weight may be added to the ring and then the lid tested to see how much the weight assists lifting the lid. If the assist is not sufficient, a second weight may be added to the ring and the lid retested. This process may continue until the desired lift-assist is achieved.

In another illustrative embodiment, the one or more weights extending from or located adjacent the pivot axis of the lid may be sufficient to serve as a stop that limits the extent to which the lid may be pivoted with respect to the opening of the dumpster. Rather than the lid being able to freely pivot on its pivot axis all the way over until its topside engages the sidewall of the dumpster (or rear wall depending on the location of the pivot axis), the lid may stop at another position such as upright. To limit the lid's movement, the counterweight may abut a portion of the sidewall (or top or rear wall as the case may be) of the dumpster when the lid is opened its predetermined amount. Illustratively, this predetermined amount may be at the point where the lid is positioned about vertical with respect to the dumpster. In other embodiments, the counterweight may be positioned such that the lid opens at an angle greater than or less than 90° with respect to the opening. In either instance, the counterweight serves as a stop structure to engage the dumpster to limit the lid's ability to open.

A perspective view of a dumpster 2, that includes front wall 4, rear wall 6, and sidewalls 8 and 10, supported by flooring 12, is shown in FIG. 1. The illustrated embodiment of dumpster 2 is a front-loading variety, including an angled top face opening 14, formed by sidewalls 8 and 10, along with front wall 4. An illustrative top wall 16 is shown at the rear portion of dumpster 2. In conjunction with the front-loading dumpster 2, illustrative pivoting lids 18 and 20 shroud top face opening 14.

Figure 2:
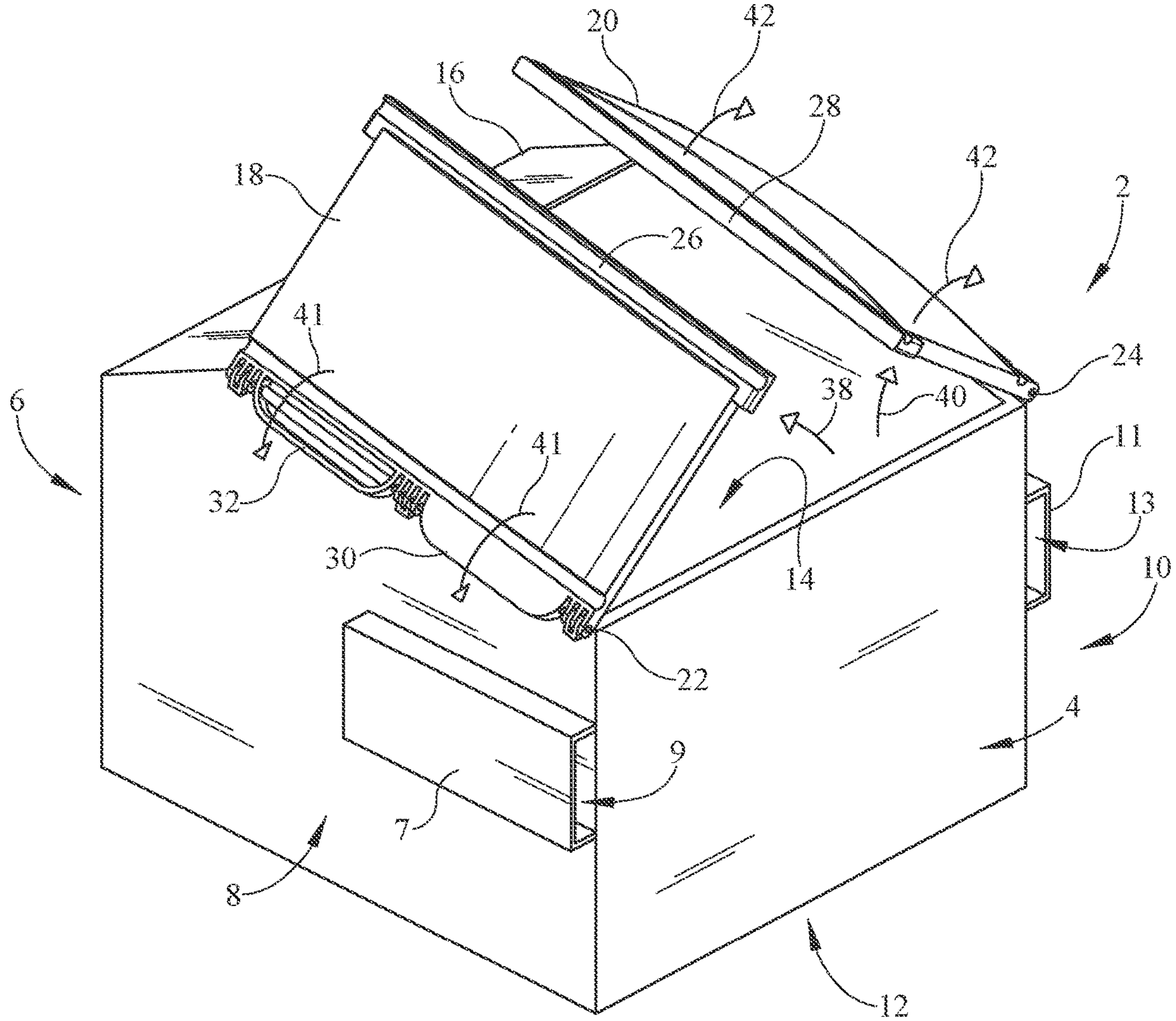
FIG. 2 is a perspective view of the dumpster with the lids partially open.
Figure 3:
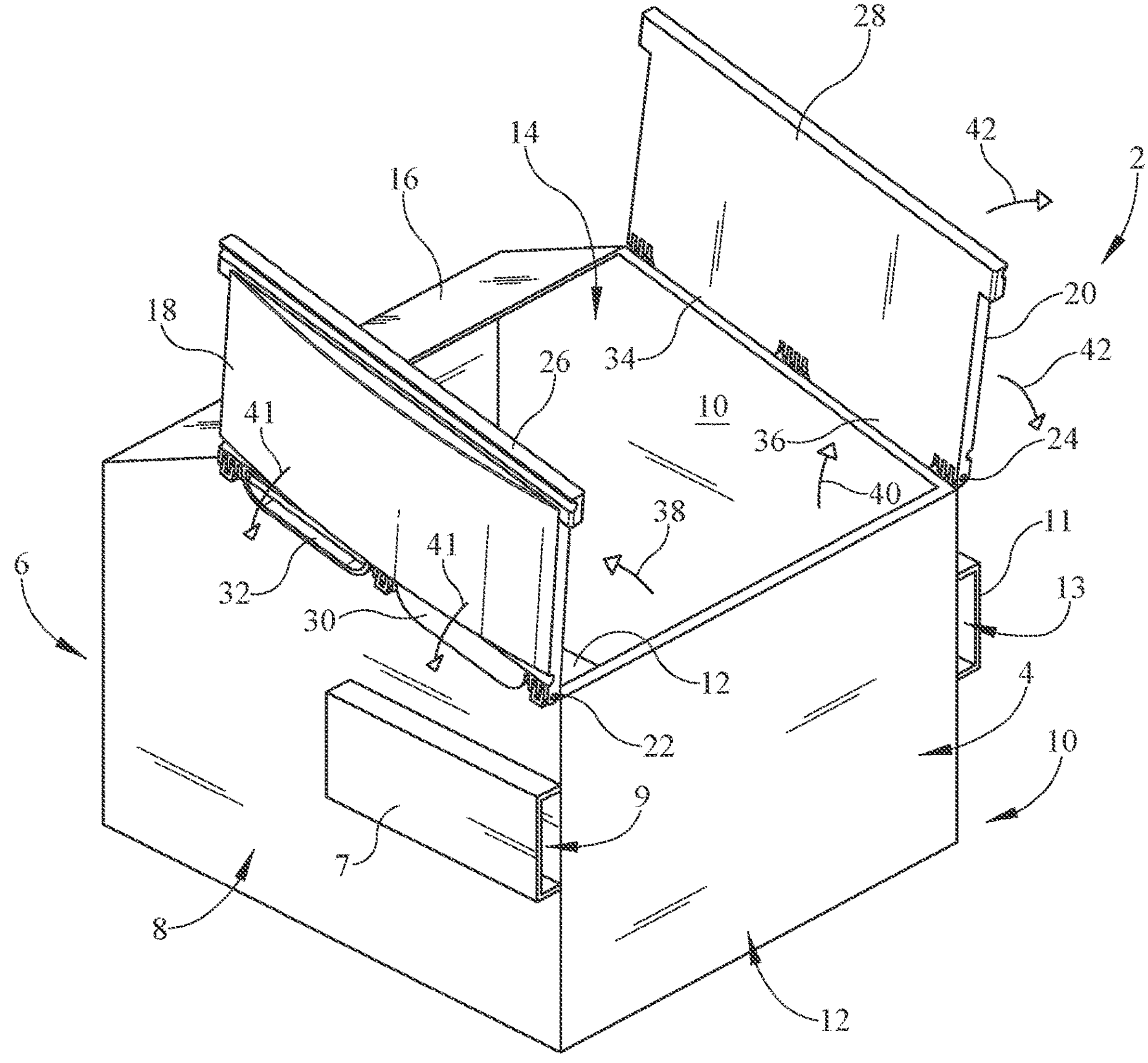
FIG. 3 is a perspective view of the dumpster with the lids open.

As shown in FIG. 1, lids 18 and 20 open to the sides, respectively, to reveal top face opening 14 of dumpster 2 (see, also, FIGS. 2 and 3). A pivot rod 22 extends through both lid 18 and a bracket (not shown) on dumpster 2, adjacent the top of same, to allow lid 18 to open and close. Pivot rod 22 serves as the pivot axis for lid 18. In the illustrated embodiment, pivot rod 22 extends from front to rear creating side-opening movement for lid 18. It is appreciated, however, that lid 18 may be so configured and pivot rod 22 likewise positioned at the rear of dumpster 2 or other location to change the opening characteristics of lid 18. By placing the pivoting rod at the rear of the lid, the dumpster lid will open from front to back. In similar fashion, pivot rod 24 extends through lid 20 and a portion of the dumpster adjacent the top of same to allow lid 20 to open and close as well. Pivot rod 24 serves as the pivot axis for lid 20. Also similar to lid 18, lid 20 may be configured so pivot rod 24 can be alternatively located at the rear of dumpster 2. This too allows lid 20 to open and close from front to rear.

In this illustrative embodiment, arm pocket brackets 7 and 11 are located on side walls 8 and 10, respectively. Pockets 9 and 13 formed by arm pocket brackets 7 and 11, respectively, receive prongs (not shown) attached to a garbage truck lift arm (not shown). The prongs lift dumpster 2 up over the top of the garbage truck and upside down to drop its contents into a container portion of the garbage truck. Lids 18 and 20 on dumpster 2 may freely pivot so that gravity opens them while dumpster 2 is located upside down over the garbage truck.

In an illustrative embodiment, each of lids 18 and 20 include at least one counterweight located opposite lid ends 26 and 28, respectively. With particular respect to lid 18, counterweights 30 and 32 are positioned adjacent pivot rod 22 opposite lid end 26. Counterweights 30 and 32 are concentrated on the opposite side of the pivot rod 22 (i.e., the pivot axis for lid 18), opposite lid end 26. As lid 18 is raised at lid end 26, thereby pivoting about pivot rod 22, counterweights 30 and 32, by virtue of their weight, move that side of lid 18 downwardly which will assist raising lid end 26 upwardly. The counterweights should then assist in opening lid 18 when same is moved to an open position when a lift force is applied at lid end 26.

The same is the case with lid 20. Counterweights 34 and 36 are positioned adjacent pivot rod 24 opposite lid end 28. With counterweights 34 and 36 located on the opposite side of pivot rod 24 (i.e., the pivot axis for lid 20) than lid end 28, as lid 20 is raised at lid end 28, counterweights 34 and 36, also by virtue of their weight, move that end of lid 20 downwardly which will assist raising lid end 28 upwardly.

Both lids 18 and 20 having this lift-assist mechanism causes lid 18 (as well as lid 20) to act as a lever. Pivot rod 22 (as well as pivot rod 24) is the fulcrum for the lever. With weight added to the lever on one side of the fulcrum, less force is required to move the lever on the side opposite the weight and spaced apart from the fulcrum. Hence, less lifting force at lid end 26 of lid 18 (as well as lid end 28 of lid 20) is required to be exerted in order for lid 18 (as well as lid 20) to open.

Another perspective view of dumpster 2 is shown in FIG. 2. In this view, the ability of lids 18 and 20 act as levers by virtue of counterweights 30, 32, 34, and 36 are demonstrated. When a lifting force 38 is applied to lid end 26 of lid 18, it pivots in direction 41 about pivot rod 22. With counterweights 30 and 32 positioned adjacent pivot rod 22, that weight is believed sufficient to allow less lift force 38 to be applied at the other side of lid 18 at lid end 26, in order to lift lid 18 with relative ease (or at least less force than what would be required to lift lid 18 without counterweights 30 and/or 32). The same is the case with lid 20. A lesser lifting force 40 than what would otherwise be needed can be applied to lid end 28 to pivot lid 20 in direction 42 about pivot rod 24 (counterweights 34 and 36 not shown in this view).

Another perspective view of dumpster 2 is shown in FIG. 3. In this view, lids 18 and 20, are pivoted about pivot rods 22 and 24, respectively, further in directions 41 and 42, respectively, so they are in a full open position. With counterweights 30 and 32 located on lid 18 and counterweights 34 and 36 located on lid 20, it is believed less force is needed than what would otherwise be applied at lid ends 26 and 28 in order to open lids 18 and 20, respectively. In some embodiments, it is believed that lift forces 38 and 40 would only need to be exerted through a certain distance (which will be less than a full distance) before the counterweights should move lids 18 and 20 in directions 41 and 42, respectively, to an open position as shown here.

In another illustrative embodiment of the present disclosure, the counterweights may serve as a stop which prevents lids 18 and 20 from opening beyond a predetermined position. As shown herein (see, also, FIG. 5), counterweights 30 and 32, abut sidewall 8 when lid 18 is in its full open position. Lid 18 cannot pivot any further in pivot direction 41. Similarly, counterweights 34 and 36 abut sidewall 10 opposite sidewall 8 limiting the extent to which lid 20 can open and pivot direction 42.

Figure 4:
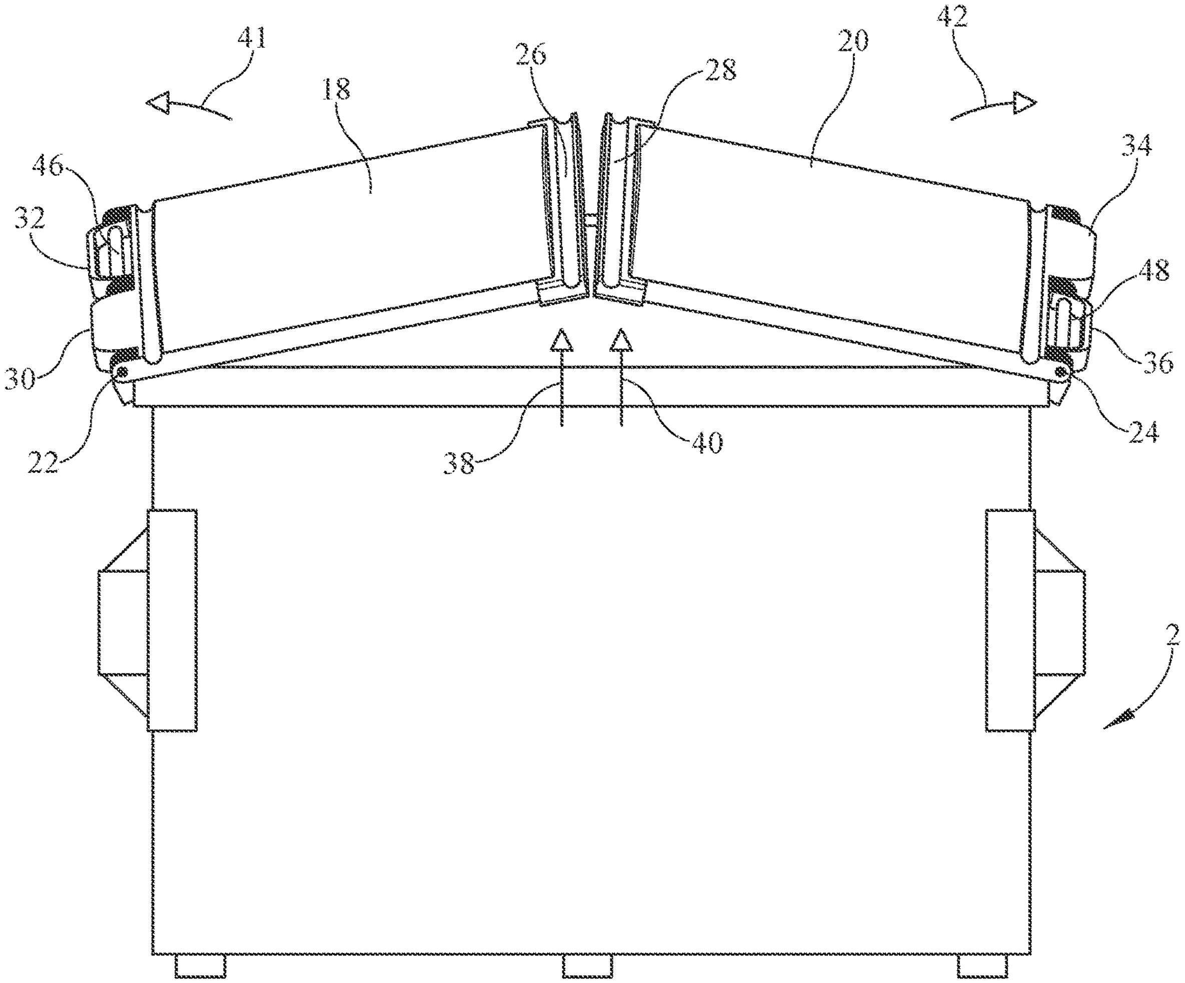
FIG. 4 is a front view of the dumpster with doors partially open.

A front view of dumpster 2 with doors 18 and 20 partially lifted in directions 41 and 42, respectively, is shown in FIG. 4. This view further depicts, for example, lid 18 attached to dumpster 2 and pivoted about pivot rod 22. Similarly, lid 20 is attached to and pivoted about pivot rod 24. Counterweights 30 and 32 are part of lid 18 opposite lid end 26. In this illustrative embodiment, counterweight 32 may be composed of a container to receive weighted materials such as metal, plastic, sand, cement, and fluid or other like weighted materials sufficient to assist lifting the lid as herein described.

Further, illustratively, pivot rod 22 may be disposed through lid 18 from front to back of dumpster 2. Accordingly, a rod sleeve 46 may be disposed either or both through lid 18 and counterweights 30 and 32 and configured to receive pivot rod 22. This is so, the weighted material will not contact pivot rod 22 and limit its ability to facilitate pivot of lid 18. In other embodiments, depending on the weighted material, rod sleeve 46 may be formed of the weighted material itself or not be needed at all. In the latter circumstance, the weighted material, such metal, plastic, sand, cement, and fluid or other like weighted materials may not interfere with pivot rod 24. Similarly, with respect to lid 20, pivot rod 24 may be disposed through lid 20 from front to back of dumpster 2. Accordingly, a rod sleeve 48 may be disposed through either or both lid 20 and counterweights 34 and 36 and configured to receive pivot rod 24. This is so the weighted material will not contact pivot rod 24 and limit its ability to facilitate pivot of lid 20. In other embodiments, depending on the weighted material, rod sleeve 48 may be formed of the weighted material itself or not be needed at all.

This view further depicts the ability of either of lids 18 or 22 to act as a lever to permit minimal lift force 38 and 40 to move lid 18 or 20 in direction 41 or 42, respectively, to open same. Again, with the pivot rod 22 (or 24) operating as a fulcrum with weight adjacent thereto, those weights should assist lifting ends 26 and 28 of lids 18 and 20, respectively, with just minimal lift force applied at lid end 26 or 28, respectively.

Figure 5:
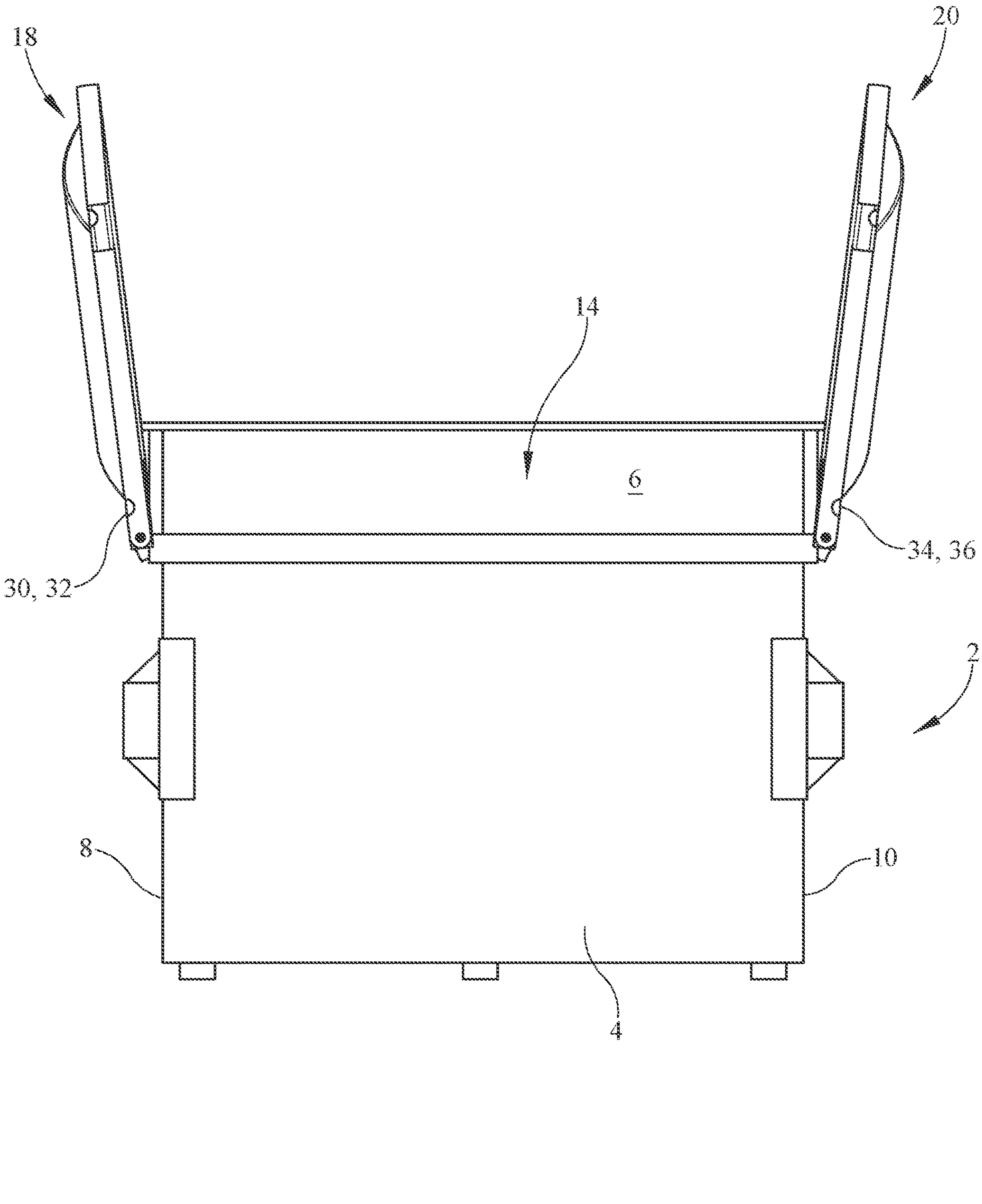
FIG. 5 is a front view of the dumpster with the lids located in an open position.
Figure 6:
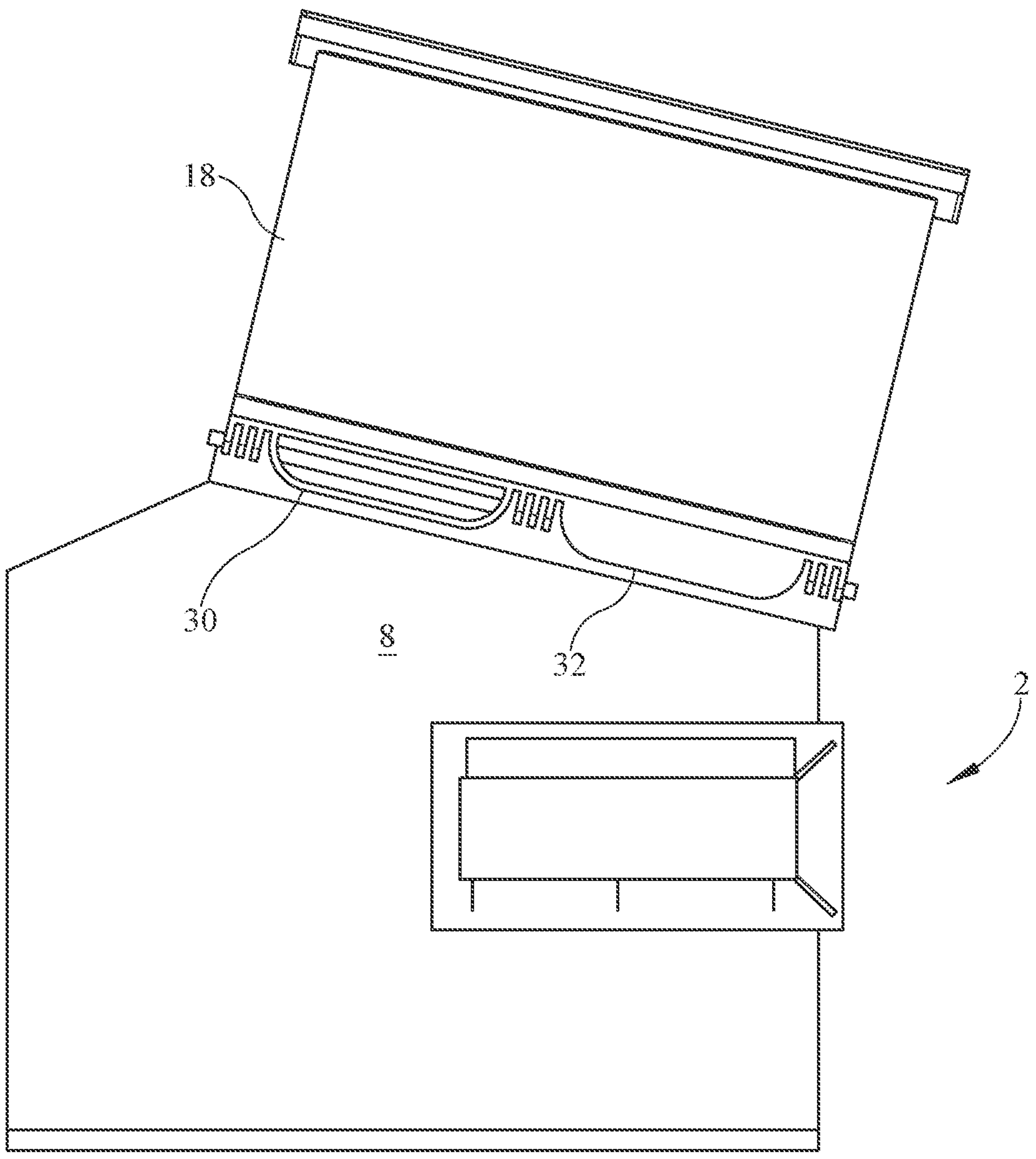
FIG. 6 is a side view of the dumpster with the lids located in an open position.

Front and side views of dumpster 2, with lids 18 and 20 located in open positions, are shown in FIGS. 5 and 6, respectively. As shown in FIG. 5, lids 18 and 20 are fully upright to reveal top face opening 14, formed by sidewalls 8 and 10, along with front wall 4 and rear wall 6. It is appreciated that the limit to which lids 18 and 20 may open with respect to dumpster 2 may be defined by the positioning of counterweights 30 and 32, with respect to lid 18 and counterweights 34 and 36 with respect to lid 20. This is further illustrated in the side view of FIG. 6 where counterweights 30 and 32, abut sidewall 8 of dumpster 2 when lid 18 is located in an upright position. Although not shown in this view, counterweights 34 and 36 of lid 20 operate in the same fashion with respect to sidewall 10 (see, also, FIG. 5).

Figure 7:
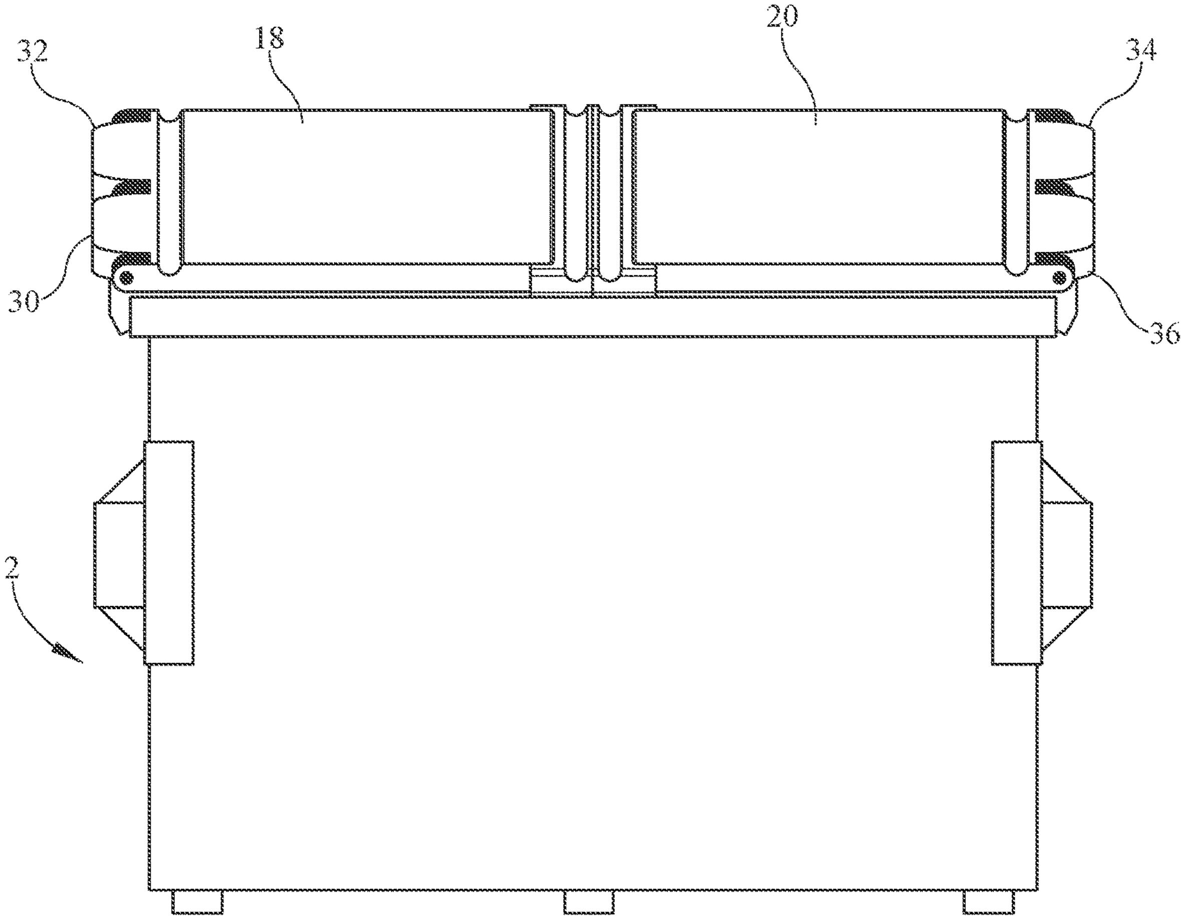
FIG. 7 is a front view of the dumpster with the lids located in a closed position.
Figure 8:
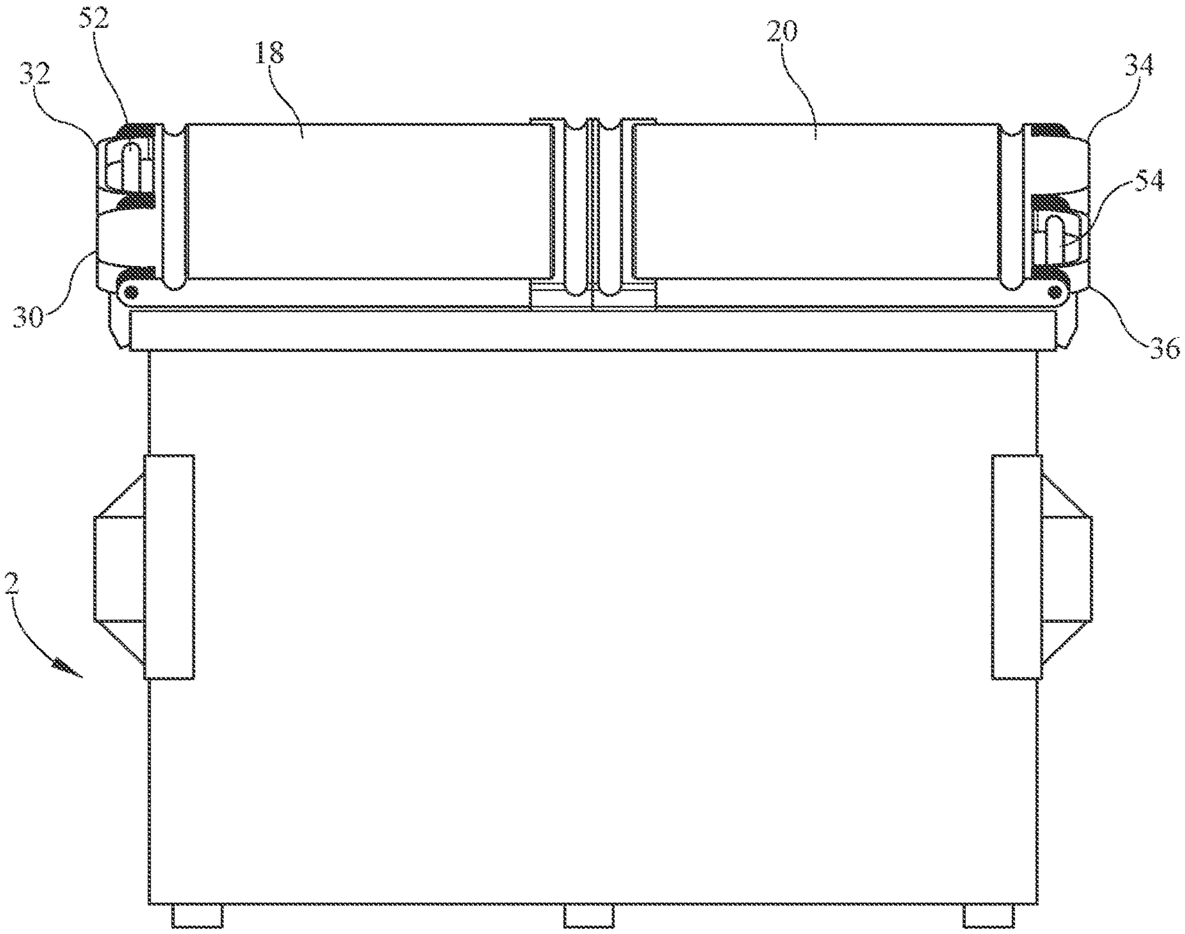
FIG. 8 is another front view of the dumpster with the lids located in the closed position.

Front views of dumpster 2 with lids 18 and 20 in closed positions are shown in FIGS. 7 and 8. As further discussed herein, the character of the counterweights on lids 18 and 20 may vary depending on the need, construction, and operation of the lids. For example, as shown in FIG. 7, counterweights 30 and 32 of lid 18 as well as counterweights 34 and 36 of lid 20 may be solid structures either formed integrally with or attached to their respective lids. Additionally, although multiple counterweights are shown for each lid, it will be appreciated by the skilled artisan upon reading this disclosure that, depending on the need, construction, or operation of the lid, one counterweight or two or more counterweights may be employed. Similarly, the precise location of the counterweight along the lid may vary depending on need, construction, or operation of same. Such characteristics of the counterweights may be adjustable depending on the effectiveness of the lid to operate as a lever so lesser lift force may be applied at the end opposite the counterweight to assist lifting the lid to its open position.

As further example, the front view of dumpster 2 shown in FIG. 8 includes both a solid filled counterweight such as counterweight 30 of lid 18 and counterweight 34 of lid 20. Alternatively, a cavity 52 may be located in counterweight 32 configured to receive weighted material. The same is the case with cavity 54 of counterweight 36 attached to lid 20. Depending on the weight of lids 18 or 20, more or less weighted material can be deposited into cavities 52 or 54 to supply sufficient weight. It is appreciated that such cavities 52 and 54 may be capped depending on the weighted material deposited and whether they would enhance the aesthetics of the lid.

Figure 9:
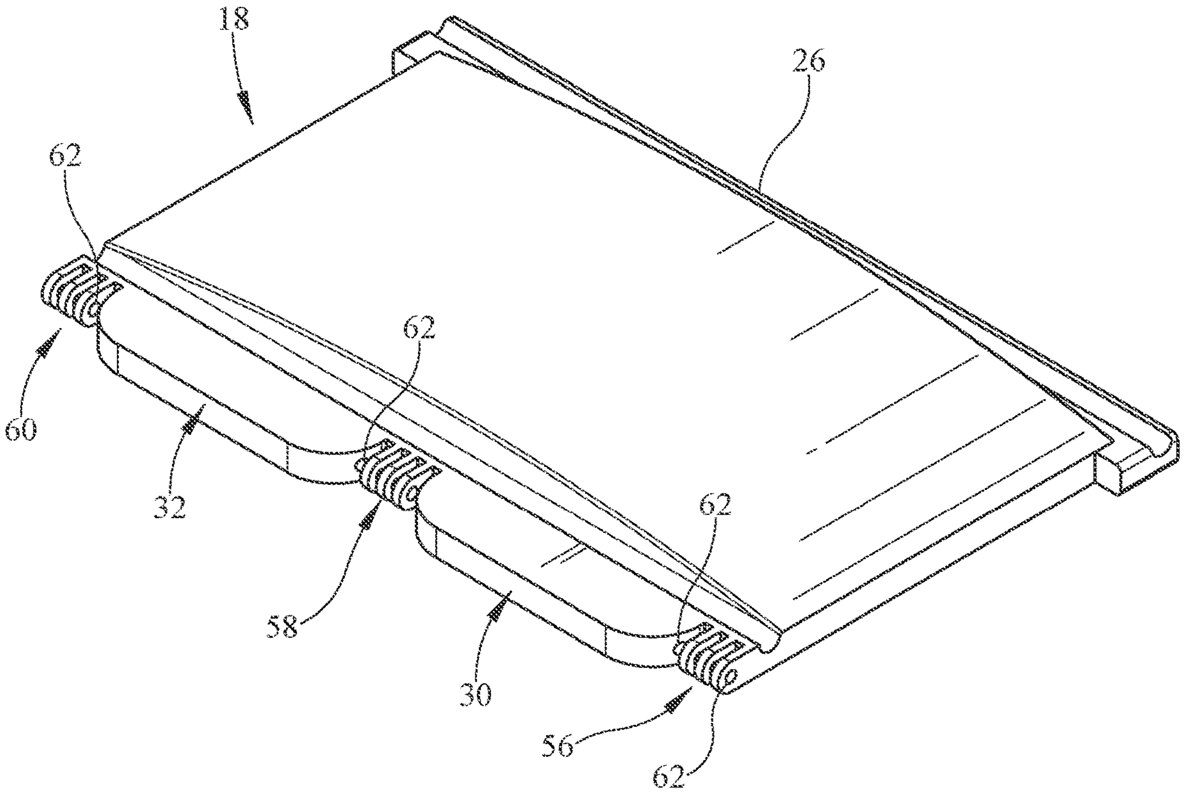
FIG. 9 is a perspective view of a dumpster lid.
Figure 10:
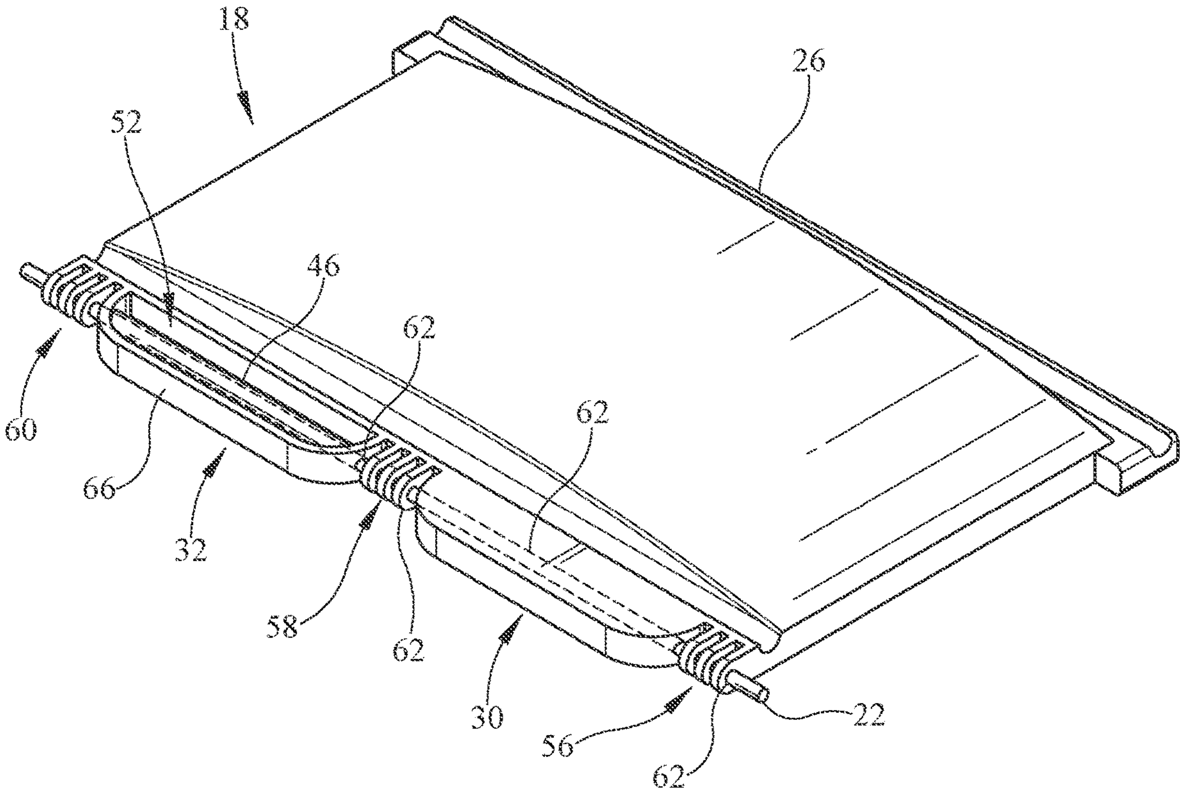
FIG. 10 is another perspective view of a dumpster lid.

Perspective views of lid 18 with counterweights 30 and 32 attached thereto are shown in FIGS. 9 and 10. For the embodiment shown in FIG. 9, both counterweights 30 and 32 are either integrally formed or are attached weighted bodies located adjacent to the pivot rod opposite lid end 26. In this illustrative embodiment, a pivot rod bore 62 is disposed through lid 18, pivot rod supports 56, 58, and 60, and counterweights 30 and 32. With respect to the pivot rod supports 56, 58, and 60, they may be composed of one or more flanges extending from lid 18 having pivot rod bore 62 disposed therein. If multiple pivot rod bores 62 are employed as shown herein, they ae coaxially aligned so that pivot rod 22 may be disposed therethrough from one side of the lid to the other. It is appreciated that the weighted material that makes up counterweights 30 and 32 may be of any variety, including metal, plastic, sand, cement, fluid, or other like weighted materials sufficient to assist lifting the lid as herein described. The material used for counterweights 30 and 32 may be different depending on the configuration of lid 18. To that end, other embodiments of lid 18 may include one counterweight or more than two counterweights. Likewise, more or less pivot rod supports may be employed as needed for supporting pivot rod 22.

The view in FIG. 10 differs from that of FIG. 9 in that counterweight 32 is of different character than that shown and FIG. 9. For example, counterweight 32 shown in FIG. 10 includes cavity 52 configured to receive any variety of weighted material, such as metal, plastic, sand, cement, fluid, or other like weighted materials sufficient to assist lifting the lid as herein described. Also shown in this view is rod sleeve 46 that shrouds pivot rod bore 62 within cavity 52 of counterweight 32. It will be appreciated by the skilled artisan upon reviewing this disclosure that depending on the weighted material employed to fill cavity 52, it is preferable that material does not contact pivot rod 22 that may inhibit movement of lid 18 with respect to pivot rod 22. It is further appreciated that, if needed, such sleeve could be inserted into counterweight 30 if such structure is needed beyond just pivot rod bore 62, as shown in this view. The result of this is that pivot rod 22 may be disposed through lid 18 as shown opposite end 26.

Further, the precise positioning of the weighted material within either or both counterweights 30 and 32 may vary depending on the amount of weight needed to assist lifting lid 18 about pivot rod 22 when applying a lift force 38 (see, also, FIGS. 2 and 3). In another embodiment, outer peripheral wall 66 may be a ring or bar configured to receive one or more weighted bodies. Outer peripheral wall 66 may act as a support that weighted bodies can hang on to provide the sufficient counterweight force opposite lid end 26. Such a configuration may provide a more varied but also precise weight configuration to counterweight 32. It is yet further appreciated that such features discussed herein with respect to lid 18 apply equally to lid 20 as well.

Figure 12:
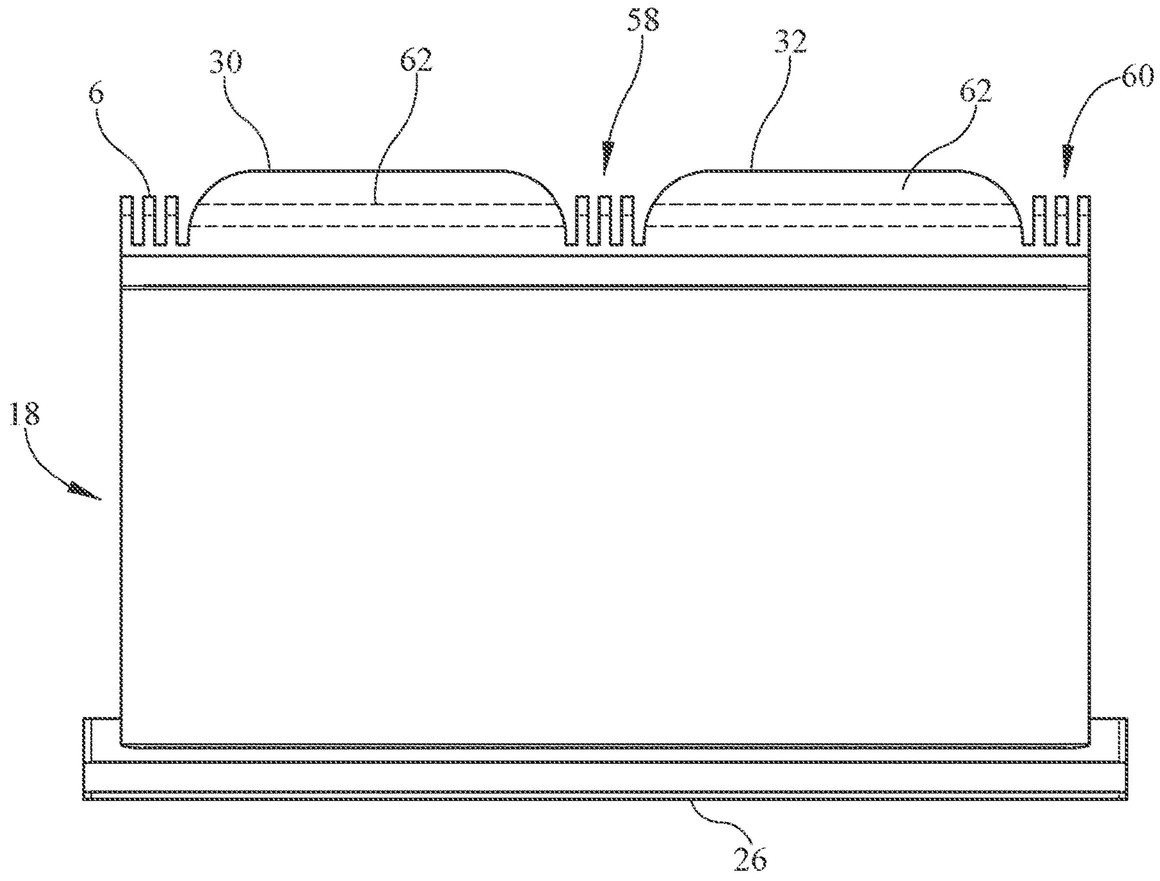
FIG. 12 is a top view of a lid.
Figure 11:
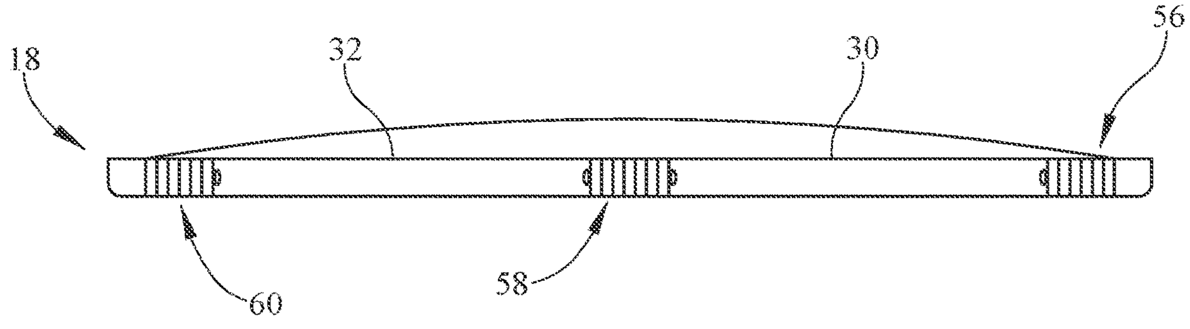
FIG. 11 is a side view of a lid.

Side and top views of lid 18 are shown in FIGS. 11 and 12, respectively. The end view shown in FIG. 11 includes illustrative positioning of counterweights 30 and 32 along with pivot rod supports 56, 58, and 60. Such is also shown in the top view of FIG. 12 along with pivot rod bore 62. As shown, pivot rod bore 62 extends through pivot rod supports 56, 58, and 60, as well as counterweights 30 and 32. Also shown in these side and top views are illustrative dimensions for lid 18. It is appreciated that the dimensions are illustrative and may vary depending on the construction of the lid. It is further appreciated that such configurations and dimensions shown herein on lid 18 and in FIGS. 11 and 12 apply to lid 20 as well.

Figure 13:
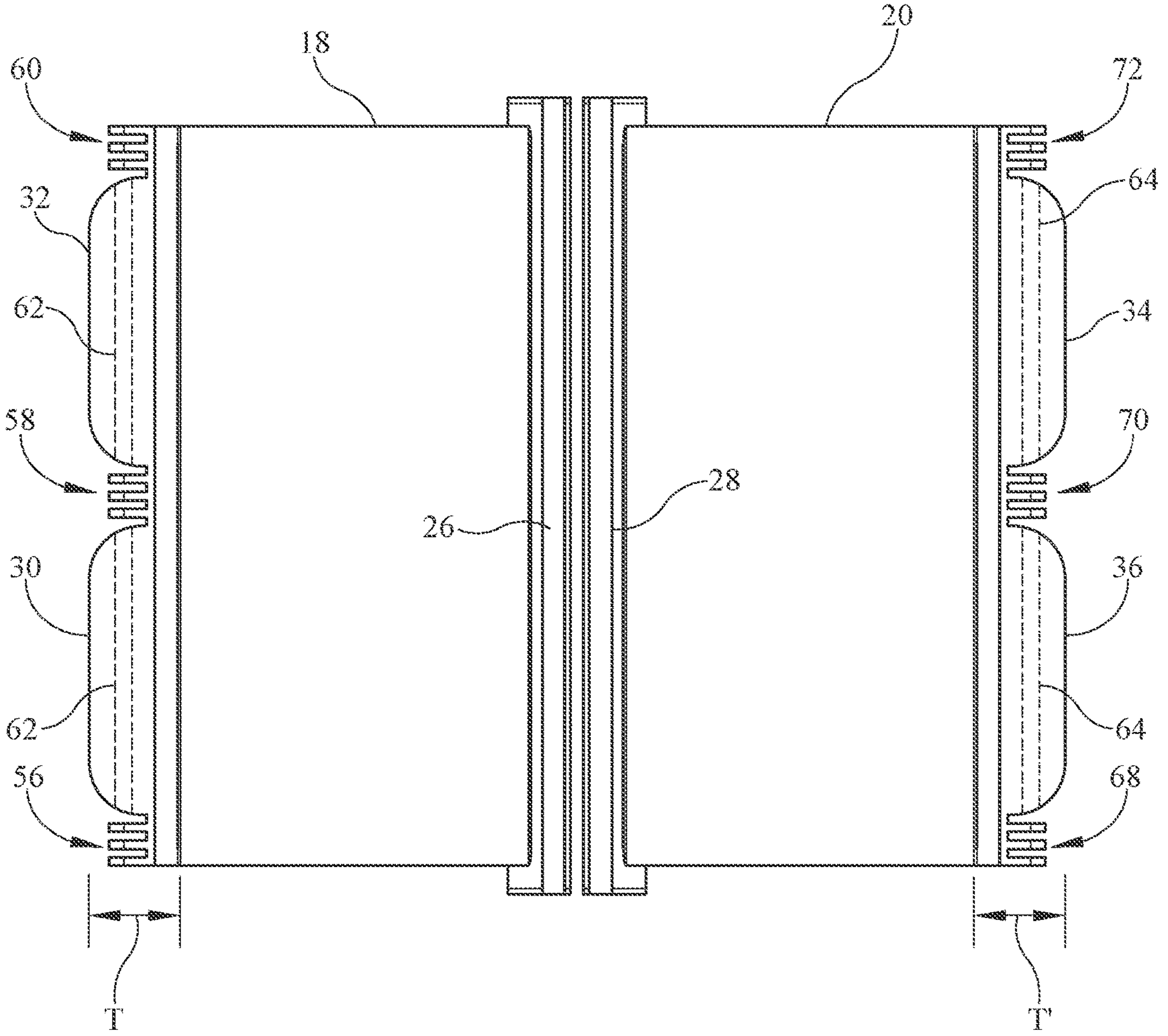
FIG. 13 is a top view of the lids.

To that end, a top view of lids 18 and 20 are shown in FIG. 13. As shown herein, pivot rod bore 62 is disposed through counterweights 30 and 32, as well as pivot rod supports 56, 58, and 60, opposite lid end 26. With respect to lid 20, pivot rod bore 64 is disposed through counterweights 34 and 36 as well as pivot rod supports 68, 70, and 72 opposite lid end 28. It is appreciated that not only are pivot rods 22 and 24 disposed through pivot rod bore 62 and 64, respectively, but also the precise location of pivot rod bore 62 and 64 may vary with respect to their lids 18 and 20 as needed to create the lever effect at lid ends 26 and 28, respectively. For example, pivot rod bore 62 may be positioned anywhere along distance T as shown in FIG. 13 as needed to create the necessary lever effect. Likewise, pivot rod bore 64 may be positioned along the T' for the same purposes.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. It should also be appreciated that, to the extent any subject matter disclosed in this non-provisional patent document conflicts with the priority application, the disclosure from this non-provisional patent document controls.

What is claimed:

1. A dumpster lid assembly for use on an opening of a dumpster, the dumpster lid assembly comprises:

at least one dumpster lid having a first end and a second end located opposite the first end;

wherein the first end is configured to be lifted to open the at least one dumpster lid with respect to the opening of the dumpster;

a pivot axis located at least adjacent the second end of the at least one dumpster lid;

wherein the at least one dumpster lid is pivotable about the pivot axis to open the at least one dumpster lid with respect to the dumpster;

at least one counterweight located at least adjacent the pivot axis and distal from the first end of the at least one dumpster lid;

wherein the at least one counterweight extends from the at least one dumpster lid to serve as a stop that limits an extent to which the at least one dumpster lid is pivotable to a predetermined amount;

wherein the at least one dumpster lid acts as a lever and the pivot rod is a fulcrum for the at least one dumpster lid such that the at least one counterweight adjacent the pivot axis assists lifting the at least one dumpster lid at the first end of the at least one dumpster lid when the at least one dumpster lid is lifted at the first end; and a pivot rod that extends coincident with the pivot axis and extends through the at least one counterweight.

2. The dumpster lid assembly of claim 1, wherein the at least one counterweight is an integrally formed part of the at least one dumpster lid.

3. The dumpster lid assembly of claim 1, wherein the at least one counterweight is attached to the at least one dumpster lid.

4. The dumpster lid assembly of claim 1, wherein the first end of the at least one dumpster lid is a front-opening end and the second end of the at least one dumpster lid is a rear-pivoting end.

5. The dumpster lid assembly of claim 1, wherein the first end of the at least one dumpster lid is a central-opening end and the second end of the at least one dumpster lid is a side-pivoting end.

6. The dumpster lid assembly of claim 1, wherein the at least one counterweight is a plurality of counterweights.

7. The dumpster lid assembly of claim 1, further comprising a pivot rod sleeve extended through the at least one counterweight.

8. The dumpster lid assembly of claim 1, wherein the pivot axis is located between at least a portion of the at least one counterweight and the first end.

9. The dumpster lid assembly of claim 1, wherein the at least one counterweight extends from the second end of the at least one dumpster lid and away from the first end.

10. The dumpster lid assembly of claim 1, further comprising at least one pivot rod support located adjacent the at least one counterweight.

11. The dumpster lid assembly of claim 1, further comprising a first pivot rod support located adjacent the second end and adjacent a first counterweight of the at least one counterweight, a second pivot rod support located adjacent to the first counterweight of the at least one counterweight and a second counterweight of the at least one counterweight, and a third pivot rod support located adjacent the second end and adjacent the second counterweight of the at least one counterweight.

12. The dumpster lid assembly of claim 1, wherein the at least one counterweight includes a fillable cavity.

13. The dumpster lid assembly of claim 1, wherein the at least one counterweight is made of a weighted material selected from the group consisting of at least one of a metal, plastic, sand, cement, and fluid.

14. The dumpster lid assembly of claim 1, wherein the at least one counterweight is selected from the group consisting of at least one of a ring and a bar.

15. A dumpster lid assembly for use on an opening of a dumpster, the dumpster lid assembly comprises:

at least one dumpster lid having a first end and a second end located opposite the first end;

wherein the first end is configured to be lifted to move the at least one dumpster lid with respect to the opening of the dumpster;

at least one counterweight located at least adjacent the second end of the at least one dumpster lid;

wherein the at least one dumpster lid acts as a lever and the pivot rod is a fulcrum for the at least one dumpster lid such that the at least one counterweight adjacent the pivot axis assists lifting the at least one dumpster lid at the first end of the at least one dumpster lid when the at least one dumpster lid is lifted at the first end;

a pivot rod that extends coincident with the pivot axis and extends through the at least one counterweight; and wherein the at least one counterweight extends from the at least one dumpster lid to serve as a stop that limits an extent to which the at least one dumpster lid.

16. The dumpster lid assembly of claim 15, wherein the at least one dumpster lid includes a pivot axis located at least adjacent the second end of the at least one dumpster lid; and wherein the at least one dumpster lid is pivotable about the pivot axis to move the at least one dumpster lid with respect to the dumpster.

17. The dumpster lid assembly of claim 15, wherein the at least one counterweight is a plurality of counterweights.

18. A dumpster lid assembly for use on an opening of a dumpster, the dumpster lid assembly comprises:

at least one dumpster lid having a first end and a second end;

wherein the first end is configured to be moved with respect to the at least one dumpster lid;

at least one weight located at least adjacent the second end and distal from the first end of the at least one dumpster lid;

wherein the at least one dumpster lid acts as a lever and the pivot rod is a fulcrum for the at least one dumpster lid such that the at least one counterweight adjacent the pivot axis assists lifting the at least one dumpster lid at the first end of the at least one dumpster lid when the at least one dumpster lid is lifted at the first end; and wherein the at least one weight configured to extend away from an edge of the dumpster to serve as a stop that limits an extent to which the at least one dumpster lid is pivotable.

* * * * *